United States Patent Office 3,598,729
Patented Aug. 10, 1971

3,598,729
METHOD OF REMOVING OIL SLICKS FROM WATER SURFACES
Heinz Baumann, 3 Zuckerfabrikstrasse,
Frankenthal, Pfalz, Germany
No Drawing. Continuation-in-part of application Ser. No. 678,214, Oct. 26, 1967. This application Nov. 13, 1969, Ser. No. 876,579
Claims priority, application Germany, Oct. 28, 1966, C 40,551
Int. Cl. B01d 15/00
U.S. Cl. 210—40
4 Claims

ABSTRACT OF THE DISCLOSURE

When a piece of fully cured urea formaldehyde resin foam is dipped into an oil slick floating on water, only the oil slick is absorbed into the piece of foam. Entry of the water is blocked by the narrow capillaries in the cell walls which connect most of the otherwise sealed air cells in the foam to each other and to the atmosphere. They permit absorption of liquids of low surface tension, but not of liquids having a surface tension as high as that of ordinary water or of sea water which essentially consists of water. Urea formaldehyde resin is much less costly than the corresponding resins prepared from melamine and phenol whose foams have a similar structure and are similarly effective.

---

This application is a continuation-in-part of my copending application, Ser. No. 678,214, filed on Oct. 26, 1967, and now abandoned.

This invention relates to the separation of liquids forming two liquid phases in contact with each other, and in its more specific aspects, to the removal of oil slicks from water.

Oil slicks on harbor waters and coastal waters have been a source of serious economic losses since the invention of ships propelled by diesel engines and of oil-carrying tankers. More recently, pollution of ocean waters with oil from leaking off-shore drilling installations has become a major problem. Although large amounts of money have been spent on measures for removing the oil slicks and for protecting the shores against deposition of the oil, the available remedial measures are woefully inadequate.

Some oil has been rendered relatively harmless by means of surface active agents which permit the oil to be dispersed in the water. Some oil has been picked up in polyurethane sponge together with water, and the liquid squeezed from the sponge then was permitted to settle for removal of the residual water, normally more voluminous than the simultaneously absorbed oil.

It has now been found that foamed urea formaldehyde polycondensate, when fully cured, absorbs oil from a water surface practically without absorbing any of the water if the latter is free from surface active agents which reduce its surface tension to less than 30 dyne/cm. Dissolved materials which do not lower the surface tension of the water phase to less than 50 dyne/cm. do not interfere with the practically complete separation of oil and water that can be accomplished by contacting the oil phase with the urea formaldehyde resin foam.

Urea formaldehyde resin foam is a staple article of commerce. It is prepared by reacting urea and formaldehyde in aqueous solution until a water soluble precondensate is formed. The precondensate is further polymerized to an insoluble, rigid resin by contact with acidic catalysts. If the precondensate and catalyst are brought together in a foam prepared from water, compressed air or other gas and a surface active agent, the lamellae of the foam solidify to resin walls. After evaporation of the water originally present and of the water formed by the condensation reaction, there is obtained a rigid foam material enclosing a multitude of air-filled cells. When the foam material is dried to moisture equilibrium with the ambient air (approximately 3%), the resin walls have a network of extremely fine capillary ducts which connect virtually all air cells with each other and with the ambient atmosphere.

The specific conditions under which the foam is made affect the bulk density of the foam, the size and distribution of the gas-filled cells, the surface configuration of the foam, and similar properties, but does not significantly affect the size and distribution of the capillaries which make the foam oleophilic and hydrophobic. They permit absorption of mineral oil hydrocarbons and of other liquids having a surface tension value of less than 30 dyne/cm. relative to air to enter the cells, but exclude liquids having a surface tension value of more than 50 dyne/cm. from absorption. At all normal atmospheric temperatures, that is, between approximately 0° C. and 50° C., oil is therefore selectively absorbed from a surface of sea water.

Other resin foams having similar chemical properties develop capillary ducts in their cell walls upon curing by evaporation of moisture and shrinkage, and have oil absorbing properties similar to those of urea formaldehyde. Commercially available resin foams suitable for separating liquids of different surface tension values, more specifically mineral oil hydrocarbons and sea water, include foams whose walls consist of melamine formaldehyde resin or phenol formaldehyde resin, and which may be prepared in substantially the same manner as the urea formaldehyde foam described above. At this time, urea formaldehyde resin foam is manufactured at a small fraction of the cost of the corresponding resins made from phenol and melamine, and is preferred.

In a specific test, a body of rigid urea-formaldehyde foam was cut to a cubic shape 8 cm. x 8 cm. x 8 cm. It weighed 8 grams, and the cube was held in a small tank partly below the surface of one liter of water in which 100 g. lubricating oil were kept dispersed by vigorous agitation. The oil was completely absorbed in the cube of foam within a few minutes, and only a minimal amount of water was withdrawn with the cube from the tank. The water remaining in the tank was free from the odor and taste of the oil. Similar results were obtained with bunker oil, fuel oil and motor oils of varying viscosities. When the water contains enough of a wetting agent to lower its surface tension to about 30 dynes/cm., water enters the foam material together with the oil and correspondingly reduces the ability of the foam to absorb oil.

Oil slicks have been removed from a water surface by dropping pieces of urea formaldehyde foam on the contaminated surface, and thereafter picking up the foam pieces by means of a coarse screen or net. The particle size and shape of the foam pieces somewhat affect the rate of oil absorption, but are not critical. Flakes, slabs, plates and other shapes of urea formaldehyde foam have been employed successfully, and the shape of the material may be chosen freely to match available equipment for application and retrieval of the foam.

Other organic liquids not miscible with water and of lower specific gravity, such as vegetable oil, petroleum ether, benzene, gasoline, have been separated from water surfaces, but heavier liquids of suitable surface tension value may also be picked up, for example, aniline, although the surface tension of the latter is somewhat higher than 30 dynes/cm.

The oil can be recovered from the foamed plastic if so desired. When the oil-bearing foam is crushed between the platens of a press, much of the oil is squeezed out and may be collected. Some oil is released when the partly saturated foam is held in a vacuum chamber. Ultimately, at least a portion of the oil can be recovered by distillation, preferably in a vacuum. It is usually most economical to burn the oil-bearing foam under a steam boiler.

Removal of the oil-laden foam from a water surface is facilitated if the foam pieces are enclosed in a container permeable to liquid before being lowered into the contaminated water. Small oil slicks are picked up conveniently by means of pieces of urea formaldehyde resin foam held in a net or a bag of open-meshed fabric, and withdrawn from the water by means of the container.

Urea-formaldehyde foam also has been used to advantage for removing oil-like material from waste water in which the oily liquid is dispersed. Practically the entire oily phase is retained when the waste material is passed through a chamber loosely packed with urea formaldehyde resin foam.

Other applications in which liquids of different surface tension values are to be separated will readily suggest themselves to those skilled in the art. It should be understood, therefore, that the invention is not limited to the examples chosen herein for the purpose of the disclosure, but is to be construed broadly and limited solely by the scope of the appended claims.

What is claimed is:
1. A method of separating two liquid phases in contact with each other, said liquid phases having respective surface tension values relative to air of not substantially more than 30 dynes per centimeter and not substantially less than 50 dynes per centimeter which comprises:
 (a) contacting the liquid phase having the lower surface tension with a body of synthetic resin foam enclosing a multiplicity of gas-filled cells and having resin walls separating said cells,
 (b) said walls being formed with a network of capillary ducts connecting more than one-half of said cells to the ambient atmosphere,
 (c) said synthetic resin being an oleophilic and hydrophobic polycondensate of formaldehyde with urea, said resin being fully cured and dried substantially to moisture equilibrium with the ambient air prior to said contacting.

2. A method as set forth in claim 1, wherein said liquid phase having the lower surface tension value essentially consists of mineral oil hydrocarbons and said other liquid phase essentially consists of water.

3. A method as set forth in claim 1, wherein said body, prior to said contacting, is dried to a moisture content not substantially greater than three percent by weight.

4. A method as set forth in claim 3, wherein said capillary ducts are dimensioned to substantially exclude the liquid phase having a surface tension value of not substantially less than 50 dynes per centimeter.

References Cited

UNITED STATES PATENTS

| | | |
|---|---|---|
| 3,093,600 | 6/1963 | Spencer et al. |
| 3,334,042 | 8/1967 | Teitsma. |
| 3,382,170 | 5/1968 | Pape _____ 210—40X |

FOREIGN PATENTS 666,990  11/1965  Belgium _____ 210—40

SAMIH N. ZAHARNA, Primary Examiner

U.S. Cl. X.R.

210—Oil-Water Digest